United States Patent
Malmlöf

(10) Patent No.: US 6,594,241 B1
(45) Date of Patent: Jul. 15, 2003

(54) CHANNEL-TYPE SWITCHING CONTROL

(75) Inventor: Jim Malmlöf, Norrfjärden (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/457,141

(22) Filed: Dec. 8, 1999

(51) Int. Cl.[7] .................................................. H04Q 7/00
(52) U.S. Cl. ........................ 370/329; 370/437; 370/464; 455/450; 455/464; 455/509
(58) Field of Search ................................. 370/329, 331, 370/352, 353, 354, 355, 437, 468, 235, 441, 464, 337; 455/436, 514, 434, 450, 464, 509, 516, 154.1, 439, 432

(56) References Cited

U.S. PATENT DOCUMENTS

| | | | |
|---|---|---|---|
| 5,319,638 A | | 6/1994 | Lin |
| 5,495,480 A | | 2/1996 | Yoshida |
| 5,535,425 A | * | 7/1996 | Watanabe ............ 455/436 |
| 5,673,259 A | * | 9/1997 | Quick, Jr. ............ 370/311 |
| 5,708,656 A | | 1/1998 | Noneman et al. |
| 5,754,541 A | | 5/1998 | Glisic et al. |
| 5,757,772 A | | 5/1998 | Thornberg et al. |
| 5,778,175 A | | 7/1998 | Paul et al. |
| 5,793,744 A | * | 8/1998 | Kanerva et al. ....... 370/209 |
| 5,859,853 A | | 1/1999 | Carlson |
| 5,901,147 A | | 5/1999 | Joffe |
| 6,347,091 B1 | * | 2/2002 | Wallentin et al. ..... 370/235 |

FOREIGN PATENT DOCUMENTS

| | | |
|---|---|---|
| EP | 0 989 765 A | 3/2000 |
| WO | 98/29975 A | 7/1998 |
| WO | 99/52307 A | 10/1999 |

* cited by examiner

Primary Examiner—Edward F. Urban
Assistant Examiner—Sonny Trinh
(74) Attorney, Agent, or Firm—Nixon & Vanderhye P.C.

(57) ABSTRACT

After a mobile user connection is assigned a particular type of channel, a sliding window with a predetermined number of time intervals is established for that connection. For each of the time intervals in that sliding window, information associated with the type of channel supporting the mobile radio connection is determined. The associated information may include one or more parameters including the type of channel currently supporting the connection, an amount of data to be transmitted for the mobile user connection, a requested quality of service, etc. The information in the sliding window is analyzed for a pattern or trend. Different patterns or trends may be used to assist in making channel-type switching as well as other decisions, e.g., power regulation. The analyzed sliding window information may be used both to determine when it is desirable to switch a user connection to another channel type and to prevent or reduce inefficient, excessive, or rapid switching of the user connection between different channel types.

37 Claims, 9 Drawing Sheets

→ No Switch

→ Switch to Intermediate Channel

→ Switch to Intermediate Channel

CHANNEL-TYPE SWITCHING CONTROL

RELATED INVENTION

This application is related to commonly assigned patent application Ser. Nos. 09/430,165, filed Oct. 29, 1999, entitled "Channel-Type Switching from a Common Channel to a Dedicated Channel Based on Common Channel Load" and Ser. No. 09/429,497, filed Oct. 29, 1999, entitled "Channel-Type Switching to a Common Channel Based on Common Channel Load."

FIELD OF THE INVENTION

The present invention relates to data packet communications, and in particular, to controlling switching between communication channels of different types.

BACKGROUND AND SUMMARY OF THE INVENTION

In current and future mobile radio communications systems, a variety of different services either are or will be provided. While mobile radio systems have traditionally provided circuit-switched services, e.g., to support voice calls, packet-switched data services are also becoming increasingly important. Example packet data services include e-mail, file transfers, and information retrieval using the Internet. Because packet data services often utilize system resources in a manner that varies over the course of a data packet session, the flow of packets is often characterized as "bursty." Transmitted packet bursts are interspersed with periods where no packets are transmitted so that the "density" of packets is high for short time periods and often very low for long periods.

Mobile communications systems must be able to accommodate both circuit-switched services and packet-switched services. But at the same time, the limited radio bandwidth must be used efficiently. Consequently, different types of radio channels may be employed to more efficiently accommodate different types of traffic to be transported across the radio interface.

The Global System for Mobile communications (GSM) is one example of a mobile communications system that offers circuit-switched services via a Mobile Switching Center (MSC) node and packet-switched services via a General Packet Radio Service (GPRS) node. For circuit-switched, guaranteed service, dedicated traffic channels are employed. A radio channel is dedicated (for the life of the mobile connection) to a particular mobile user and delivers frames of information as received without substantial delay. Typically, a dedicated channel provides a high data throughput. For packet-switched, best effort service, common channels are employed where plural mobile users share the common channel at the same time. Typically, a common channel delivers packets of information at a relatively low data throughput. Thus, when the quality of service parameter (s) requested is (are) relatively high, e.g., for a speech or synchronized communication, soft/softer handover, etc., a dedicated, circuit-switched channel is well suited to handle this kind of traffic. When the quality of service requested is relatively low, e.g., for an e-mail message, or if the user only has a small amount of data to transmit, a common, packet-switched channel is well suited to handle this kind of traffic. However, there is no "switching" between different types of channels in GSM/GPRS. All dedicated traffic is GSM circuit-switched, and all common traffic is GPRS packet-switched.

The selection of the appropriate channel type and channel type switching are prominent features to be included in third generation mobile systems that employ Wideband Code Division Multiple Access (W-CDMA). The third generation wideband CDMA systems must support a variety of circuit-switched and packet-switched services over a wide range of bit rates, e.g., kilobits per second to megabits per second. Two of the most critical radio resources in wideband CDMA needed to support such services are channelization codes and transmission power. Channelization codes are used to reduce interference and to separate information between different users. The more channel capacity required, the more channelization codes that must be allocated. The other critical radio resource is transmission power/interference level. Dedicated channels employ closed loop transmit power control which provides more accurate power assignments resulting in less interference and lower bit error rate. Common channels usually employ open loop power control which is less accurate and not as well suited for transmitting large amounts of data.

There are additional challenges in wideband CDMA systems to offering new and diverse services while at the same time effectively and efficiently distributing the limited system resources. For example, while data traffic is by nature "bursty," as described above, traffic patterns are also affected by the particular transmission protocol employed. For example, the most commonly used transmission protocol on the Internet today is Transmission Control Protocol (TCP). TCP provides reliable, in-order delivery of a stream of bytes and employs a flow control mechanism and a congestion control mechanism. The amount of data delivered for transmission is regulated based on the amount of detected congestion, i.e., packets lost due to overflow in routers caused by traffic greater than the network capacity. To accomplish this regulation, when TCP senses the loss of packets, it reduces the transmission rate by half or more and only slowly increases that rate to gradually raise throughput. Another factor to consider is the use of different Quality of Service (QoS) classes. For example, three different priority classes may be provided to users in a network: low priority would include users with small demands in throughput and delays (e.g., an e-mail user), medium priority users that demand a higher level of throughput (e.g., Web service), and high priority users requiring high throughput with low delays (e.g., voice, video, etc.).

Because of the bursty nature of packet data transmissions, congestion-sensitive transmission protocols, QoS parameters, and other factors, (collectively "dynamic aspects" of packet data transmissions), the channel-type best-suited to efficiently support a user connection often changes during the life of that user connection. At one point, it might be better for the user connection to be supported by a dedicated channel, while at another point it might be better for the user connection to be supported by a common channel. The problem addressed by the present invention is determining if, when, and how often to make a channel-type switch during the course of a particular user connection.

One way of determining when to switch a user connection from a dedicated channel to a common channel is to monitor the amount of data currently being stored in a transmission buffer associated with that user connection. When the amount of data stored in the buffer is less than a certain threshold, that smaller amount of data may not justify the use of a dedicated channel. On the other hand, the decrease in the amount of data to be transmitted for that user may only be temporary, given the dynamic aspects of data transmission, and the amount of data in the buffer may quickly accumulate because of the load on the common channel or increased capacity needs for the connection. As a result, the connection may need to be switched right back to a dedicated channel.

Consider the situation where a user connection is currently assigned a dedicated radio channel having a higher data transmission rate/capacity than the current incoming rate of the user data to be transmitted over that channel. This situation might arise if there is congestion at some part of the Internet, e.g., Internet congestion causes TCP to dramatically reduce its transmission rate as described above. A slower incoming rate may also be the result of a "weak link" in the connection external to the radio network, e.g., a low speed modem. In such situations, the radio transmit buffer is emptied faster than the data to be transmitted arrives. As a result of the slow incoming data rate, which may very well only be temporary, the user connection is switched to a common channel, even though soon thereafter, the user has a large amount of data to transmit. Consequently, shortly after the user connection is transmitted to the common channel, the buffer fills up rapidly due to lower throughput on the common channel, and the user connection is switched right back to a dedicated channel. These conditions may ultimately result in rapid, prolonged switching back and forth between a common channel and a dedicated channel as long as such conditions persist. Such "ping-pong" effects are undesirable because each channel type switch consumes power of the battery-operated terminal, loses packets during the switch, and requires additional control signaling overhead.

FIG. 1 is a graph simulating a constant 32 kbit/sec incoming data stream to the transmission buffer where the user connection is assigned a dedicated channel with a capacity of 64 kbit/sec. The common channel capacity was simulated at 16 kbit/sec but is illustrated as 0 kbit/sec in FIG. 1. The buffer's channel switch threshold which triggers a switch from dedicated-to-common channel and from common-to-dedicated channel is set at 1000 bytes. An expiration timer is set to one second. FIG. 1 shows the allocated achieved channel capacity (in kbit/sec) plotted against time under these simulated conditions where the user connection is cyclically switched between a 64 kbps dedicated channel (after about one second) and a common channel (after less than 0.5 seconds).

FIG. 2 shows the buffer amount (in bytes) versus time for this same simulation. The buffer amount is approximately 600 bytes when the user is on the dedicated channel, which is below the threshold of 1,000 bytes. Therefore, the user connection is switched to the common channel as soon as the one second timer expires. But on the common channel, the transmit buffer is filled very quickly by the 32 kbit/sec incoming stream up to about 2000 bytes which, because it exceeds the 1000 byte threshold, results in a rapid channel switch back to the dedicated channel. This kind of rapid channel switch cycling ("ping-pong" effect) is undesirable, as described earlier, because of the resources necessary to orchestrate each channel-type switch and the time required to set up a dedicated channel.

The present invention solves the above-identified problems. Information associated with a type of communications channel supporting a mobile radio connection between a mobile radio and a radio network is determined over a number of time intervals. The determined information is analyzed for a pattern or trend. A channel-type switching decision is made, i.e., whether to switch the mobile radio connection to a different type of radio channel, based on the analysis. The associated information may include the actual channel type currently supporting the mobile connection during each of the time intervals. Channel types may include, for example, a dedicated type of channel temporarily allocated to support a single mobile radio connection and a common type of radio channel shared by plural mobile radio connections. Alternatively, there may be three or more different types of channels.

One criteria for the channel-type switching decision may be to avoid undesirable channel-type switching such as rapid back-and-forth channel-type switching. In this regard, if the channel type over the number of time intervals differs, it may be decided to maintain the mobile user connection on one type of channel for a predefined number of time intervals to prevent back-and-forth channel-type switching.

The information associated with the type of communications channel supporting a mobile radio connection over a number of time intervals may also include an amount of data to be transmitted over the radio connection. If the data amount for each of the time intervals is below a threshold while the mobile user connection is being supported by a higher capacity channel, a decision may be made to switch the mobile user connection down to a lower capacity type of channel. Alternatively, if the data amount for each of the time intervals is above a threshold while the mobile user connection is being supported by a lower capacity channel, the mobile user connection may be switched up to a higher capacity channel. If a decision is made to switch the mobile radio connection down from the higher capacity channel, the mobile radio connection may first be switched to an intermediate capacity channel before a decision is made to switch the connection down to the lower capacity channel. Similarly, if a decision is made to switch the mobile radio connection up from the lower channel, it may be switched to the intermediate channel before switching to the higher capacity channel. As yet another example alternative, if a decision is made to switch the mobile radio connection down from the higher capacity channel, a switch may be made to the lower capacity channel followed by a switch to the intermediate channel if a switch up decision is subsequently made.

The first number of time intervals may be viewed as a sliding window. In an example, non-limiting embodiment, the sliding window stores both a channel type and a data amount for each time interval in a memory array. Of course, other parameters may be monitored in the sliding window. At the end of the next time interval, data stored in the memory array is shifted so that the channel type and data amount in the last window position are removed and a most recently determined channel type and data amount are stored in the first window position. A second, longer sliding window may also be maintained in a second memory array. Other longer term decisions may be made based on the longer sliding time window such as power regulation, channel-type switching, etc.

The present invention may be implemented in a radio network control node or in a mobile station. In a preferred example embodiment, the invention is implemented in a radio network control node having a memory coupled to data processing circuitry. The data processing circuitry determines over a first number of time intervals information associated with a type of channel supporting a mobile radio connection between a mobile radio and a mobile radio network for each of the time intervals. The determined information is stored in and shifted through the memory as described above. The information in the sliding window is analyzed for a trend or pattern, and the channel-type switching decision is based on that analysis. The radio network control node includes a channel switching mechanism that may be configured for example at a lower communications protocol layer to implement channel-type switching decisions.

BRIEF DESCRIPTION OF THE DRAWINGS

The foregoing and other objects, features, and advantages of the invention will be apparent from the following description of preferred example embodiments as well as illustrated in the accompanying drawings in which reference characters refer to the same parts throughout. While individual functional blocks and components are shown in many of the figures, those skilled in the art will appreciate these functions may be performed by individual hardware circuits, by a suitably programmed digital microprocessor or general purpose computer, by an application specific integrated circuit (ASIC), and/or by one or more digital signaling processors (DSPs).

DETAILED DESCRIPTION OF THE DRAWINGS

In the following description, for purposes of explanation and not limitation, specific details are set forth, such as particular embodiments, network architectures, signaling flows, protocols, techniques, etc., in order to provide an understanding of the present invention. However, it will be apparent to one skilled in the art that the present invention may be practiced in other embodiments that depart from these specific details. For example, while the present invention is sometimes described in the example context of channel-type switching between specific types of channels, e.g., dedicated and common, those skilled in the art will appreciate the present invention can be applied to other types of channels and channel switching situations. Although the present invention is disclosed in the example context of mobile radio communications, it may also be employed in other systems where channel-type switching may be employed. Detailed descriptions of well-known methods, interfaces, devices, protocols, and signaling techniques are omitted so as not to obscure the description of the present invention with unnecessary detail.

Figure 1:
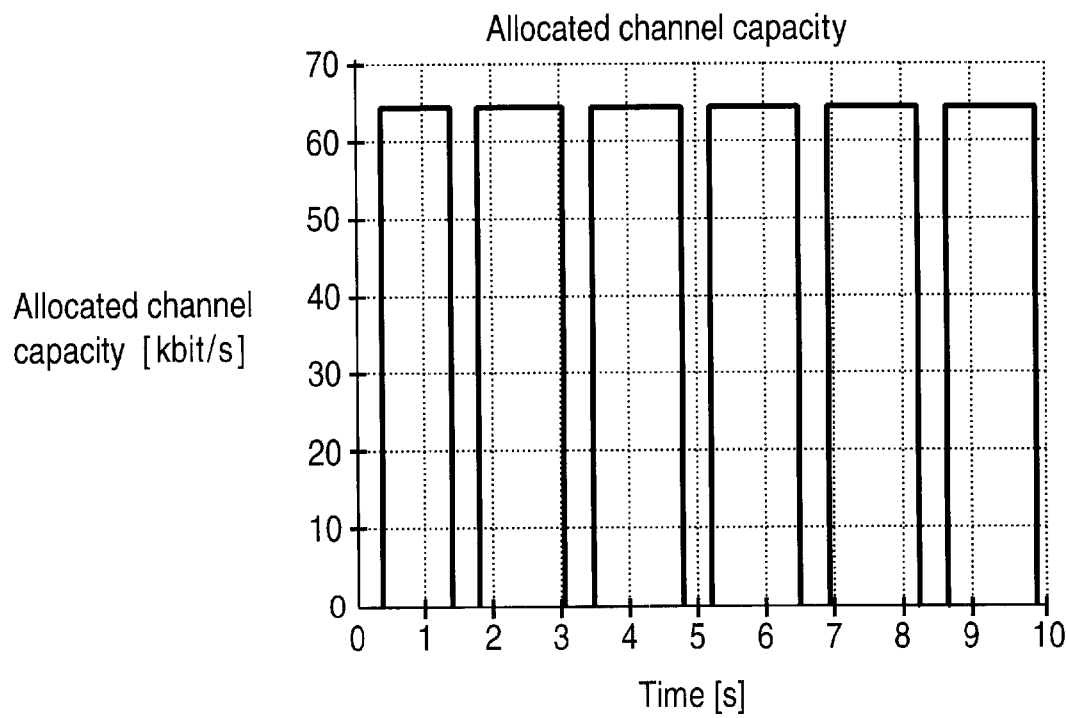
FIG. 1 is a graph illustrating allocated channel capacity versus time in a simulated channel switching scenario.
Figure 2:
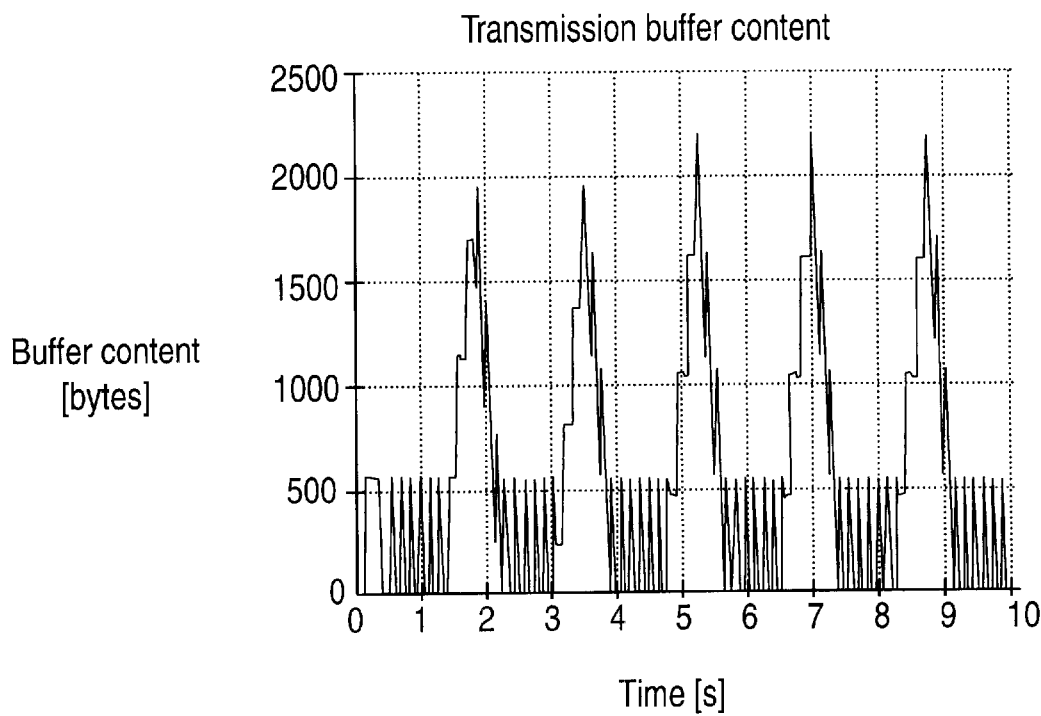
FIG. 2 is a graph illustrating transmission buffer content versus time in the simulated scenario of FIG. 1.
Figure 3:
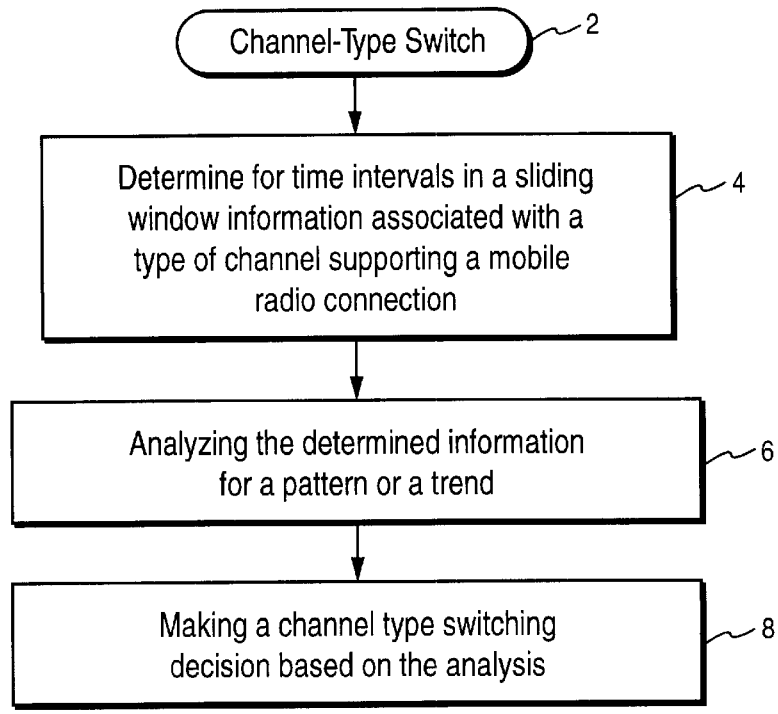
FIG. 3 is a flowchart diagram illustrating a channel-type switching method in accordance with one example embodiment of the present invention.

A general description of the present invention is now provided with reference to the channel-type switching method (block 2) illustrated in function block format in FIG. 3. Again, this method may be implemented in any type of communications system (including both wired and wireless) where a user connection may be switched to different types of channels. Assuming that the mobile user connection is assigned to a particular type of channel, a sliding window with a predetermined number of time intervals is established. For each of the time intervals in that sliding window, information associated with a type of channel supporting the mobile radio connection is determined (block 4). The associated information may include one or more parameters. In the non-limiting example described below, that associated information includes the type of channel currently supporting the mobile user connection during a particular time interval. Example channel types include a dedicated type of radio channel temporarily allocated to support a single mobile radio connection and a common type of radio channel shared by plural mobile radio connections. Other types of associated information may also be considered including a quality of service associated with a type of channel, a current interference level impacting the channel currently supporting the mobile radio connection, etc. The sliding window information is analyzed for a pattern or a trend (block 6). Different patterns or trends may be used to assist in making a channel-type switching as well as other decisions (block 8).

The channel-type switching decision may include actually switching channel-types or maintaining the mobile radio connection on the type of channel currently supporting it. The analyzed sliding window information may be used to prevent or reduce inefficient, excessive, or rapid switching of the user connection between different channel types, i.e., a "yo-yo" effect. A channel-type switch may also be avoided if the "cost" of making the channel-type switch to another type of channel is "more expensive" than the cost of maintaining the user connection on the current channel. That cost may include, for example, data processing resources associated with channel setup and take down, the delay associated with channel setup and take down, the use (efficient or inefficient) of limited channel resources, battery drain in the mobile associated with channel switching, etc. On the other hand, channel switching may be desirable in order to efficiently use channel resources or meet the need required of the user connection. For example, it may be more efficient to shift lower volume, lower priority user connections to a common channel to permit more efficient use of dedicated channel resources. However, a lower volume, high priority user connection may be maintained on a dedicated channel to provide increased performance to high priority users.

Figure 4:
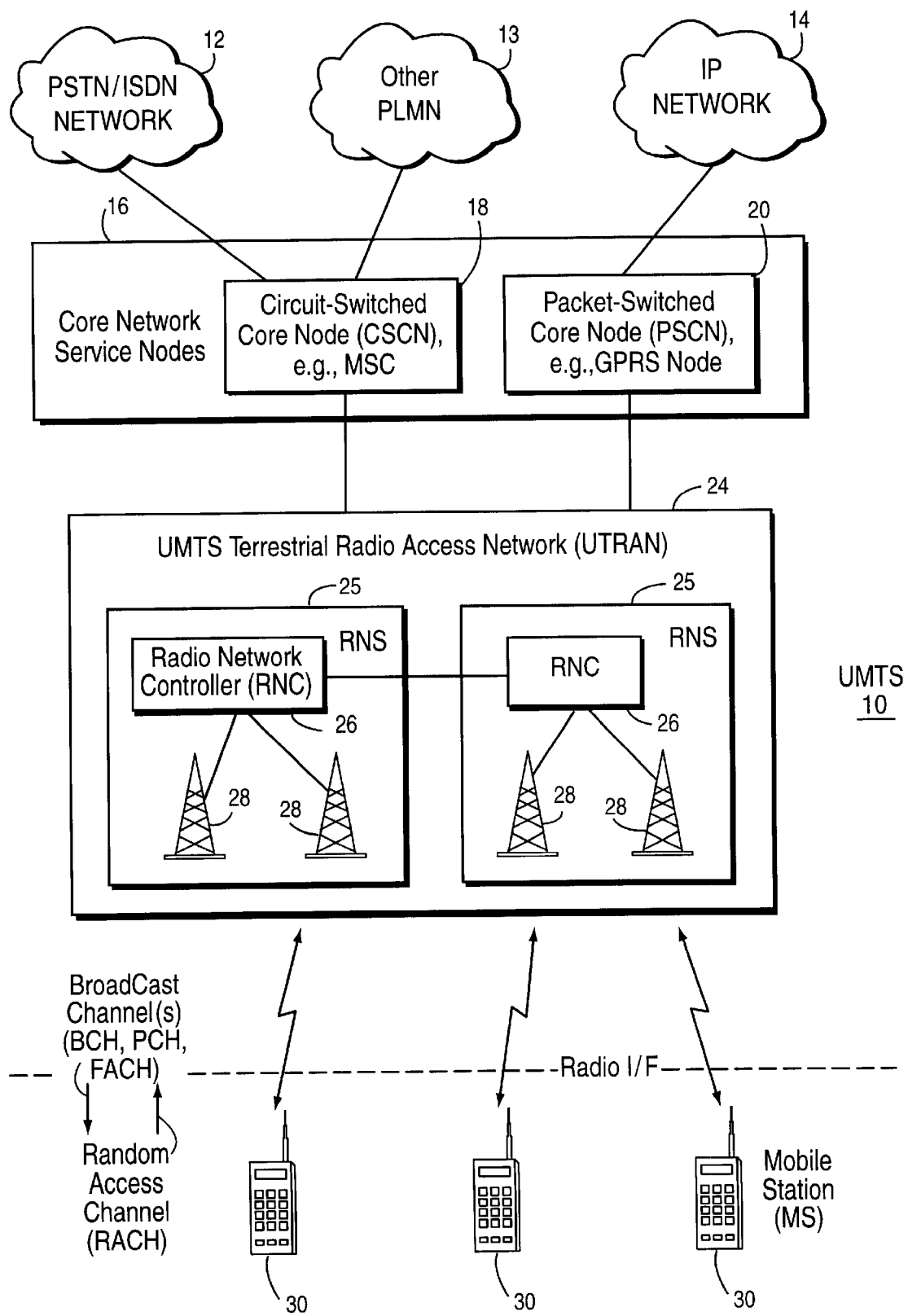
FIG. 4 is a function block diagram illustrating a Universal Mobile Telephone System (UMTS) in which the present invention may be advantageously employed.

One advantageous application of the present invention is now described in the non-limiting, example context of a universal mobile telecommunications system (UMTS) 10 shown in FIG. 4. A representative, circuit-switched, external core network, shown as a cloud 12 may be for example the public switched telephone network (PSTN) and/or the integrated services digital network (ISDN). Another circuit-switched, external core network may correspond to another Public Land Mobile radio Network (PLMN) 13. A representative, packet-switched, external core network shown as cloud 14 may be for example an IP network such as the Internet. The core networks are coupled to corresponding network service nodes 16. The PSTN/ISDN network 12 and other PLMN network 13 are connected to a circuit-switched core node (CSCN) 18, such as a Mobile Switching Center (MSC), that provides circuit-switched services. The UMTS 10 may co-exist with an existing cellular network, e.g., the Global System for Mobile Communications (GSM). The packet-switched network 14 is connected to a packet-switched core node (PSCN), e.g., a General Packet Radio Service (GPRS) node 20 tailored to provide packet-switched type services in the context of GSM which is sometimes referred to as the Serving GPRS Service Node (SGSN). Each of the core network service nodes 18 and 20 connects to a UMTS terrestrial radio access network (UTRAN) 24 over a radio access network interface. The UTRAN 24 includes one or more radio network systems (RNS) 25 each with a radio network controller (RNC) 26 coupled to a plurality of base stations (BS) 28 and to the RNCs in the UTRAN 24.

Preferably, radio access over the radio interface in the UMTS 10 is based upon wideband, Code Division Multiple Access (WCDMA) with individual radio channels allocated using CDMA channelization or spreading codes. Of course, other access methods may be employed like the well known TDMA access used in GSM. WCDMA provides wide bandwidth for multimedia services and other high transmission rate demands as well as robust features like diversity handoff and RAKE receivers to ensure high quality communication service in a frequently changing environment. Each mobile station is assigned its own scrambling code in order for a base station 28 to identify transmissions from that particular mobile station. The mobile station also uses its own scrambling code to identify transmissions from the base station either on a general broadcast or common channel or transmissions specifically intended for that mobile station. That scrambling code distinguishes the scrambled signal from all of the other transmissions and noise present in the same area.

Different types of control channels are shown bridging the radio interface. For example, in the forward or downlink direction, there are several types of broadcast channels including a general broadcast channel (BCH), a paging channel (PCH), and a forward access channel (FACH) for providing various types of control messages to mobile stations. In the reverse or uplink direction, a random access channel (RACH) is employed by mobile stations whenever access is desired to perform location registration, call origination, page response, and other types of access operations.

Figure 5:
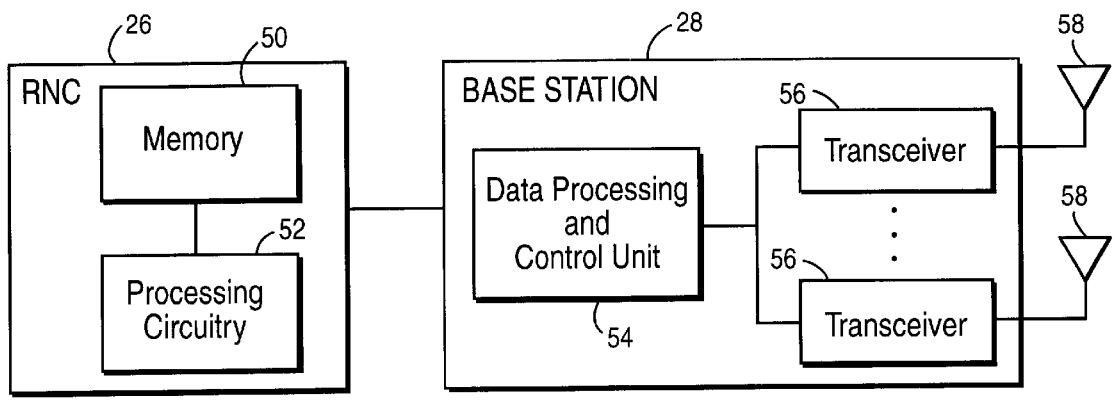
FIG. 5 is a function block diagram of a radio network controller and a base station shown in FIG. 4.

Simplified function block diagrams of the radio network controller 26 and base station 28 are shown in FIG. 5. The radio network controller 26 includes a memory 50 coupled to data processing circuitry 52 that performs numerous radio and data processing operations required to perform its control function and conduct communications between the RNC and other entities such as the core network service nodes, other RNCs, and base stations. Data processing circuitry 52 may include any one or a combination of suitably programmed or configured general purpose computer, microprocessor, microcontroller, dedicated logic circuitry, DSP, ASIC, etc., as described above. The base station 28 includes a data processing and control unit 54 which, in addition to performing processing operations relating to communications with the RNC 26, performs a number of measurement and control operations associated with base station radio equipment including transceivers 56 connected to one or more antennas 58.

Figure 6:
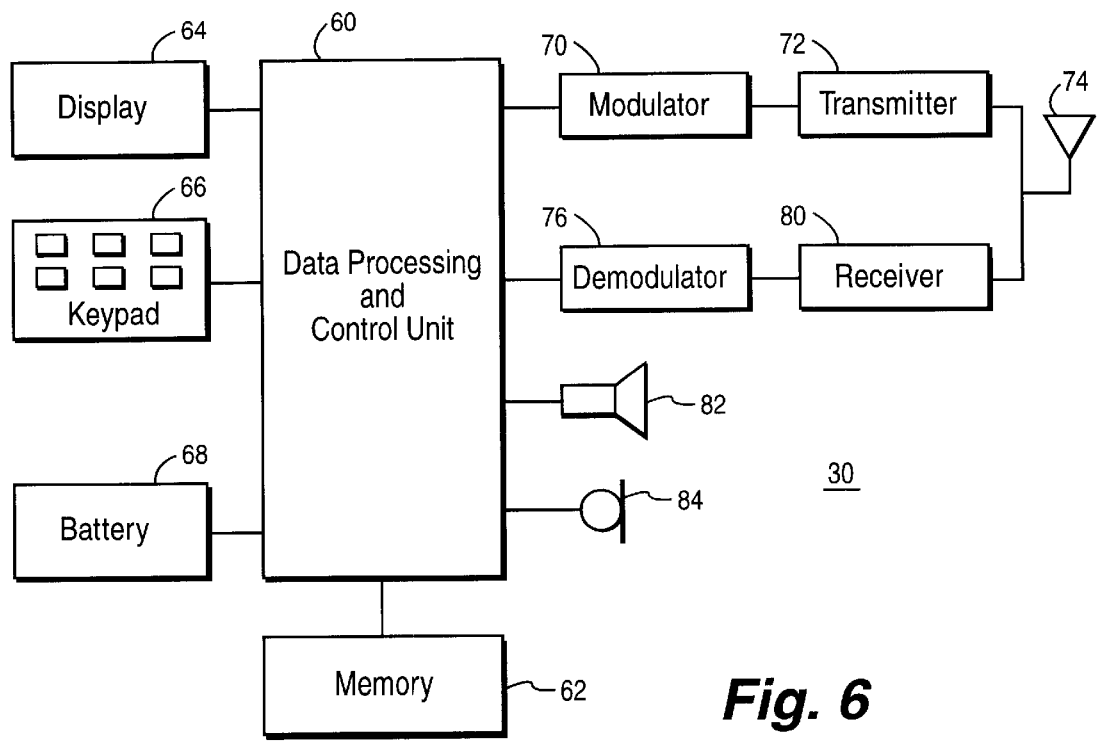
FIG. 6 is a function block diagram of a mobile station.

A simplified function block diagram of a mobile station 30 is shown in FIG. 6. The mobile station 30 includes an antenna 74 for transmitting signals to and for receiving signals from a base station 28. The antenna 74 is coupled to radio transceiving circuitry including a modulator 70 coupled to a transmitter 72 and a demodulator 76 coupled to a receiver 80. The radio transceived signals include signaling information in accordance with an air interface standard applicable to the wideband CDMA system shown in FIG. 3. The data processing and control unit 60 and memory 62 include the circuitry required for implementing audio, logic, and control functions of the mobile station. Memory 62 stores both programs and data. Conventional speaker or earphone 82, microphone 84, keypad 66, and display 64 are coupled to the data processing and control unit 60 to make up the user interface. A battery 68 powers the various circuits required to operate the mobile station.

Figure 7:
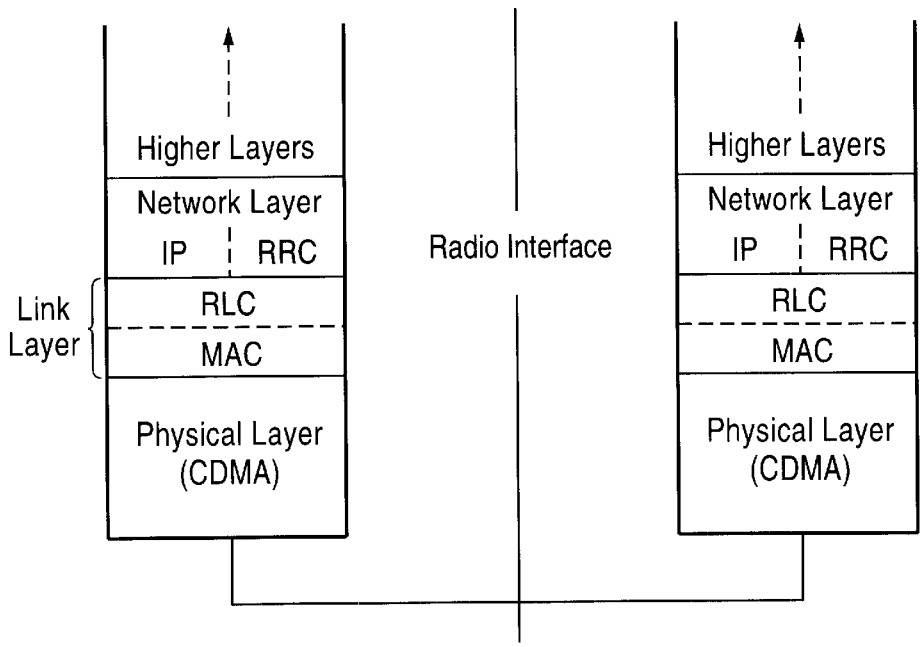
FIG. 7 is a diagram illustrating transmission protocol layers that may be employed in the UMTS system shown in FIG. 4.

The radio interface shown in FIG. 4 is divided into several protocol layers with several lower level layers illustrated in FIG. 7. In particular, a mobile station uses these protocol layers to communicate with similar protocol layers in the UTRAN. Both protocol stacks include: a physical layer, a data link layer, a network layer, and higher layers. The data link layer is split into two sublayers: a radio link control (RLC) layer and medium access control (MAC) layer. The network layer is divided in this example into a control plane protocol (RRC) and a user plane protocol (IP).

The physical layer provides information transfer services over the air interface using wideband CDMA performs the following functions: forward error correction encoding and decoding, macrodiversity distribution/combining, soft handover execution, error detection, multiplexing and demultiplexing of transport channels, mapping of transport channels onto physical channels, modulation and spreading/demodulation and despreading of physical channels, frequency and time synchronization, power control, RF processing, and other functions.

The medium access control (MAC) layer provides unacknowledged transfer of service data units (SDUs) between peer MAC entities. The MAC functions include selecting an appropriate transport format for each transport channel depending on data rate, priority handling between data flows of one user and between data flows of different users, scheduling of control messages, multiplexing and demultiplexing of higher layer PDUs, and other functions. In particular, the MAC layer performs dynamic radio transport channel-switching functions. The RLC performs various functions including the establishment, release, and maintenance of an RLC connection, segmentation and reassembly of variable length, higher layer PDUs into/from smaller RLC PDUs, concatenation, error correction by retransmission (ARQ), in sequence delivery of higher layer PDUs, duplicate detection, flow control, and other functions. The transmit buffers assigned to mobile user connections are controlled at the RLC layer.

The control plane part of the network layer in the UTRAN consists of a radio resource control protocol (RRC). The RRC protocol allocates radio resources and handles the control signaling over the radio interface, e.g., radio access bearer control signaling, measurement reporting and handover signaling. The user plane part of the network layer includes the traditional functions performed by layer 3 protocols such as the well known Internet Protocol (IP).

Figure 8:
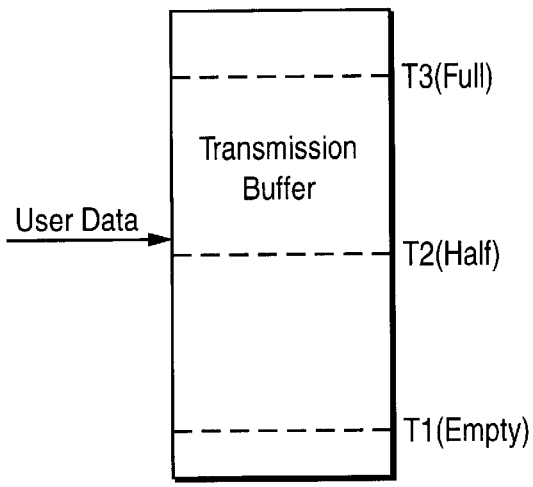
FIG. 8 illustrates a transmission buffer with example data amount thresholds used to store data corresponding to a mobile user connection before being transmitted over the radio channel-type assigned to that mobile user connection.

FIG. 8 illustrates, in this non-limiting example application of the invention, a transmission buffer allocated to store data associated with a user connection. The transmission buffer in this example has three threshold levels T1, T2, and T3. T1 corresponds to a lower threshold which, in this example, is substantially near empty. Threshold T2 corresponds to a partially full transmission buffer referred to in this example as "half." The threshold T3 corresponds to a substantially near full transmission buffer denoted as "full." The buffer amount is one example of a parameter that may be stored in a sliding window associated with a mobile radio connection for each time interval.

Figure 9:
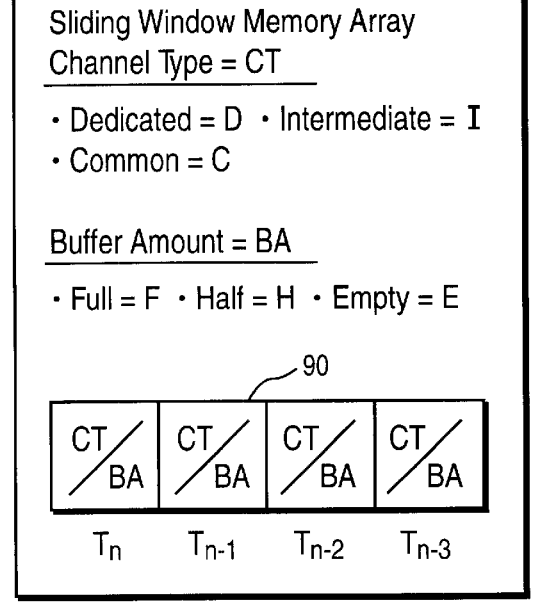
FIG. 9 shows an example sliding window memory array.

FIG. 9 illustrates a non-limiting, example sliding window configured as a memory array. The sliding window memory array 90 stores information for four predetermined time intervals $T_n$, $T_{n-1}$, $T_{n-2}$, and $T_{n-3}$. Of course, other numbers of time intervals may be used. The actual length of the sliding window is determined as a design parameter in a way that best suits a particular application. In the example sliding window 90, two different informational parameters are stored for each time interval including a channel type (CT) and a buffer amount (BA) associated with the mobile user connection for that time interval. In this non-limiting example, the channel type can be indicated as a dedicated channel (D), an intermediate channel (I), and a common-type channel (C). The intermediate channel may have for example less capacity than a dedicated channel but more capacity than a common channel. Alternatively, the intermediate channel may be able to provide a higher quality of service than the common channel but not as high as the dedicated type of channel. Other criteria could be used to define one or more intermediate channels. The sliding window functions like a shift register in a first-in-first-out fashion. The oldest channel type and buffer amount information in time interval $T_{n-3}$ is removed from the sliding window array 90 when channel-type and buffer amount information for the next time interval is stored in the array location associated with $T_n$. The previously stored information for $T_n$, $T_{n-1}$, and $T_{n-2}$ is shifted over one position to $T_{n-1}$, $T_{n-2}$, and $T_{n-3}$, respectively.

Figure 10A:
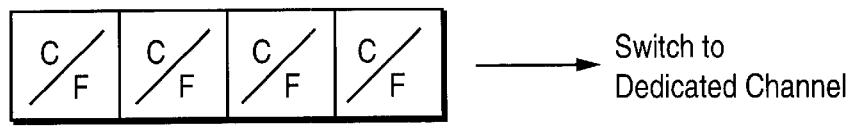
FIGS. 10A–10F illustrate examples of different array patterns or trends.
Figure 10B:
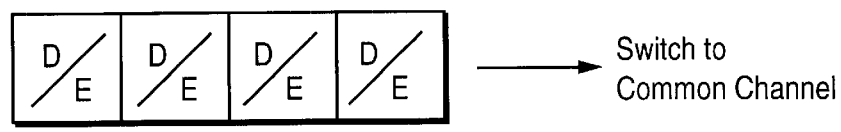

The information in the sliding window memory array is analyzed to identify one or more patterns or trends. Example sliding window memory array patterns are now illustrated in FIGS. 10A–10F. The sliding window in FIG. 10A shows that during all four time intervals, the mobile user connection was supported by a common channel and the transmission buffer was full. In this situation, a decision may be made to switch the mobile user connection to a higher capacity dedicated channel that would be better able to handle the higher rate at which user data is being input to the transmission buffer. Conversely, the pattern in the sliding window memory array of FIG. 10B shows that during all four time intervals, the mobile user connection was supported by a dedicated channel and the transmission buffer was substantially empty. Based on this pattern, a decision may be made to switch the mobile user connection to a common channel which may more efficiently use radio resources (as compared to a dedicated channel) for the relatively small amount of user data to be transmitted.

Figure 10C:
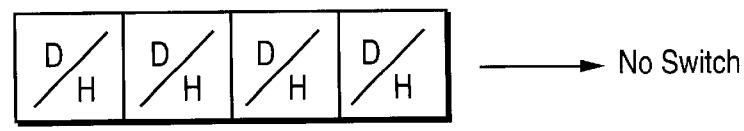
Figure 10D:
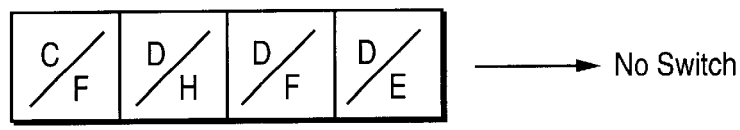

The sliding window pattern in FIG. 10C shows that the mobile user connection was supported by a dedicated channel during the four time intervals with the transmission buffer being half full. This type of pattern might suggest that no type of channel switch is necessary, or at least not worth the "cost" of a switch. Similarly, the pattern in the sliding window of FIG. 10D shows a common channel with a full buffer in the first time interval, a dedicated channel with a half full buffer in the next two time intervals, and a dedicated channel with an empty buffer in the final time interval. A decision may be made not to switch the channel type in this type of fluctuating pattern. Alternatively, a decision may be made to switch to the intermediate-type channel as a compromise channel type.

Figure 10E:
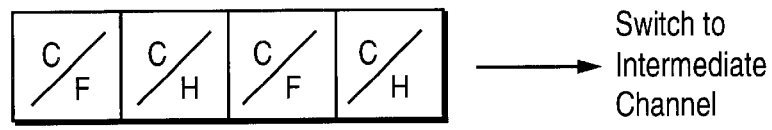
Figure 10F:
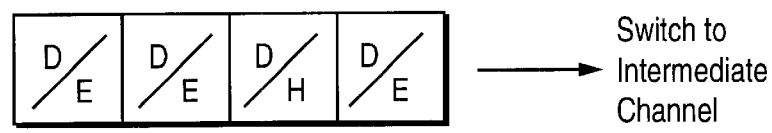

In the sliding window example of FIG. 10E, a common channel supports the user connection with two of the time intervals showing a full buffer and two showing a half full buffer. This situation might suggest switching the user connection from the common channel to the intermediate channel which has more capacity to handle the larger volume of data for this user connection. Conversely, the sliding window example of FIG. 10F shows the mobile user connection supported during all four intervals by a dedicated channel. However, three of those intervals show an empty buffer, and one interval shows a half buffer. This trend suggests that it may be worthwhile to switch to an intermediate channel which might be better matched to the amount of data to be transmitted for this mobile user connection.

Other types of patterns or trends might be used, and different types of channel-type switching actions/inactions may be associated with each pattern or trend. Several non-limiting examples follow. First, if a sliding window shows any channel-type switch or change in buffer amount, no channel-type switch may be made until a consistent trend is noticed in one direction. Second, if a channel-type switch is made, a subsequent channel switch may be prohibited until after a predetermined time interval has expired. Third, when there are three or more different types of channels, switch to the intermediate channel before switching to one of the more extreme channel type, which in this example correspond to the dedicated and common channels. Fourth, switch from one extreme to the other, e.g., from higher capacity to lowest capacity, and if a subsequent switch back toward the one extreme is indicated, switch the user connection to the intermediate channel.

Figure 11:
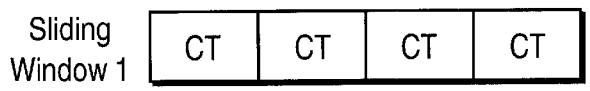
FIG. 11 illustrates another example sliding window memory array configuration.
Figure 11:
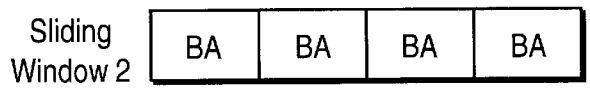
Figure 12:
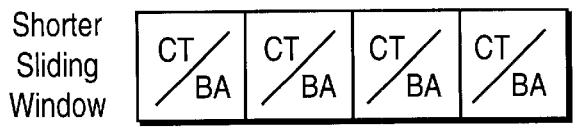
FIG. 12 illustrates a shorter sliding window and a longer sliding window.
Figure 12:
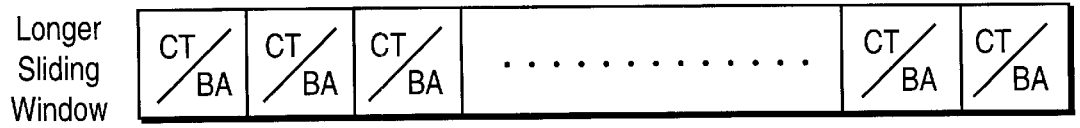

The channel-type switching information may be stored in other sliding window configurations. For example, FIG. 11 shows two sliding windows 1 and 2. Sliding window 1 stores the channel type for four time intervals, and sliding window 2 stores the buffer amount for the same four time intervals. In another variation, a shorter sliding window may be used in conjunction with a longer sliding window such as is shown in FIG. 12. The shorter sliding window may be used for short term type decisions and the longer window for longer term decisions. While those decisions may be with respect to the type of channel that should support the mobile user connection, they may also be for other operations such as power regulation. Preferably, the longer window is composed of information shifted into or out of the shorter sliding window. Both short term and long term trends may be considered in channel-type switching decisions or other operations.

Figure 13:
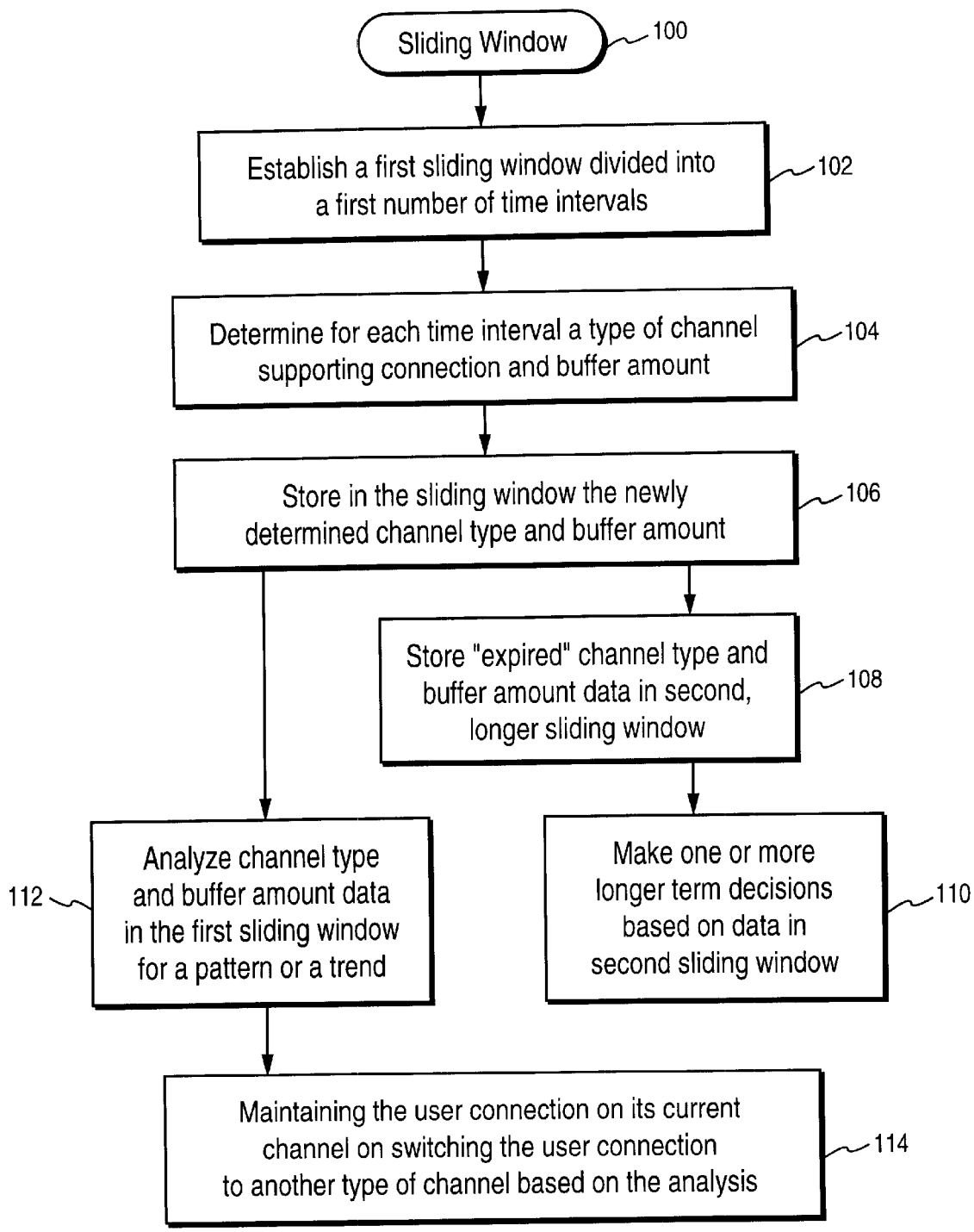
FIG. 13 is a flowchart diagram illustrating an example sliding window procedure based on the exemplary data structures shown in FIGS. 8–12.

FIG. 13 shows one non-limiting, example of a sliding window routine (block 100). A first sliding window is divided into a first number of time intervals (block 102). For each time interval, the type of channel supporting the connection and the amount of data stored in the transmission buffer for that user connection are determined (block 104). The newly determined channel type and buffer amount are stored in a sliding window memory array (block 106).

Expired channel type and buffer amount data may optionally be stored in a second, longer sliding window as described above (block 108). If this option is employed, one or more longer term decisions may be made based upon the data in the second, longer sliding window (block 110). The channel-type and buffer amount data stored in the first, shorter sliding window are analyzed for a pattern or a trend (block 112). Based on the analysis, the mobile user connection is either maintained on its current channel type or switched to another type of channel (block 114).

Figure 14:
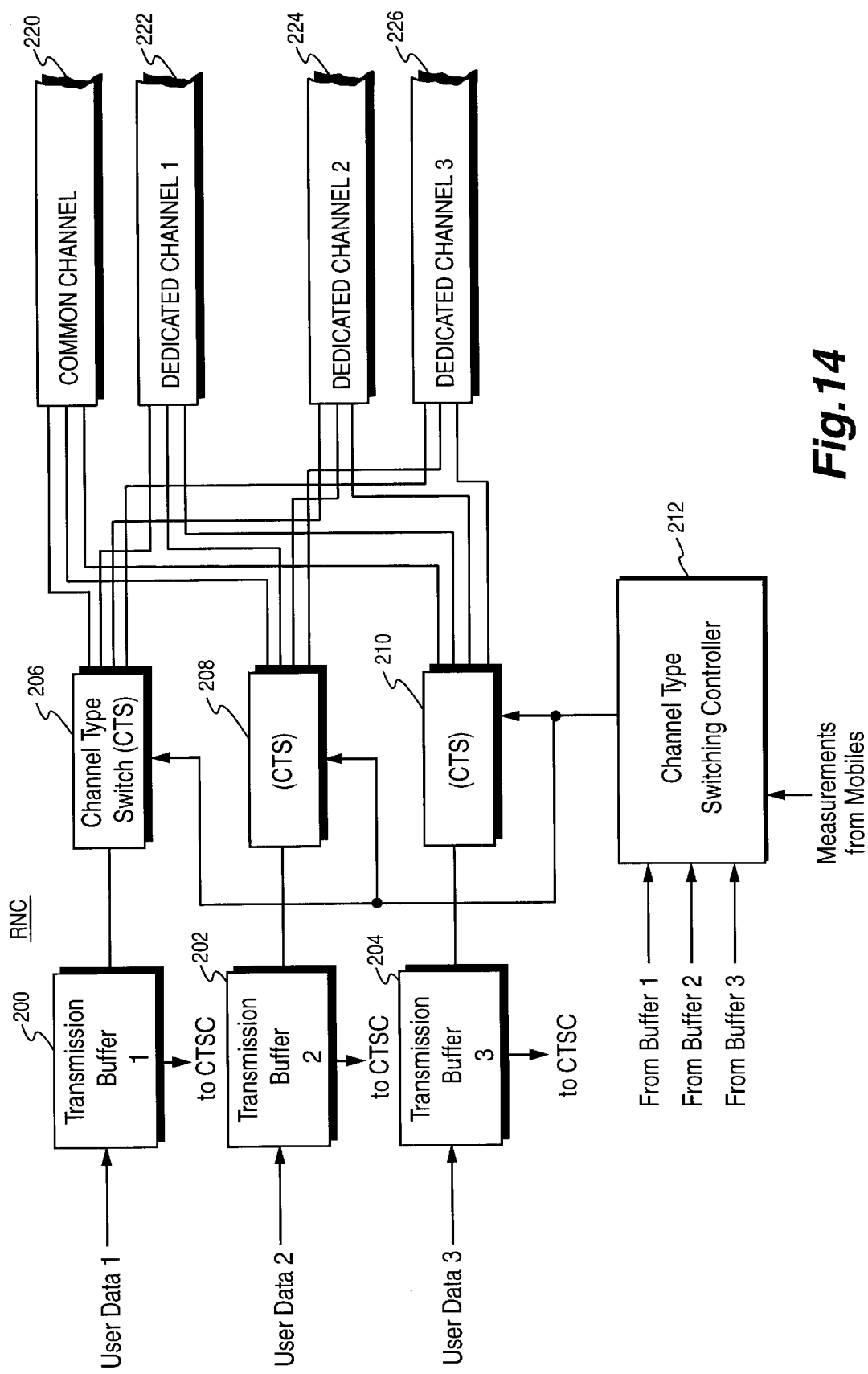
FIG. 14 is a function block diagram illustrating an example implementation of the present invention in a radio network controller.

FIG. 14 illustrates a preferred but still example implementation of the present invention as implemented in a radio network controller (RNC). In this example, three user data connections 1, 2, and 3 are coupled to respective transmission buffers 1–3 (200–204), e.g., RLC buffers. The amount of data currently stored in each of the three transmission buffers is provided to the channel-type switching controller (CTSC) 212. Each transmission buffer 200–204 is coupled to a corresponding channel-type switch (CTS) 206, 208, and 210 that may be implemented for example at the MAC protocol layer. Each of the channel-type switches is controlled by the channel-type switching controller 212. For each mobile user connection, the channel-type switching controller 212 makes transmit buffer threshold comparisons to detect buffer amounts, detects channel type, stores and updates the respective sliding window information, analyzes the sliding windows for patterns, and decides whether a channel-type switch is appropriate. Using such an analysis, the channel-type switching controller 212 appropriately routes data from each of the transmission buffers via its respective channel-type switch (206–210) to the selected type of channel. Of course, a channel type switch is not made if it is unwise or if it is not necessary.

Figure 15:
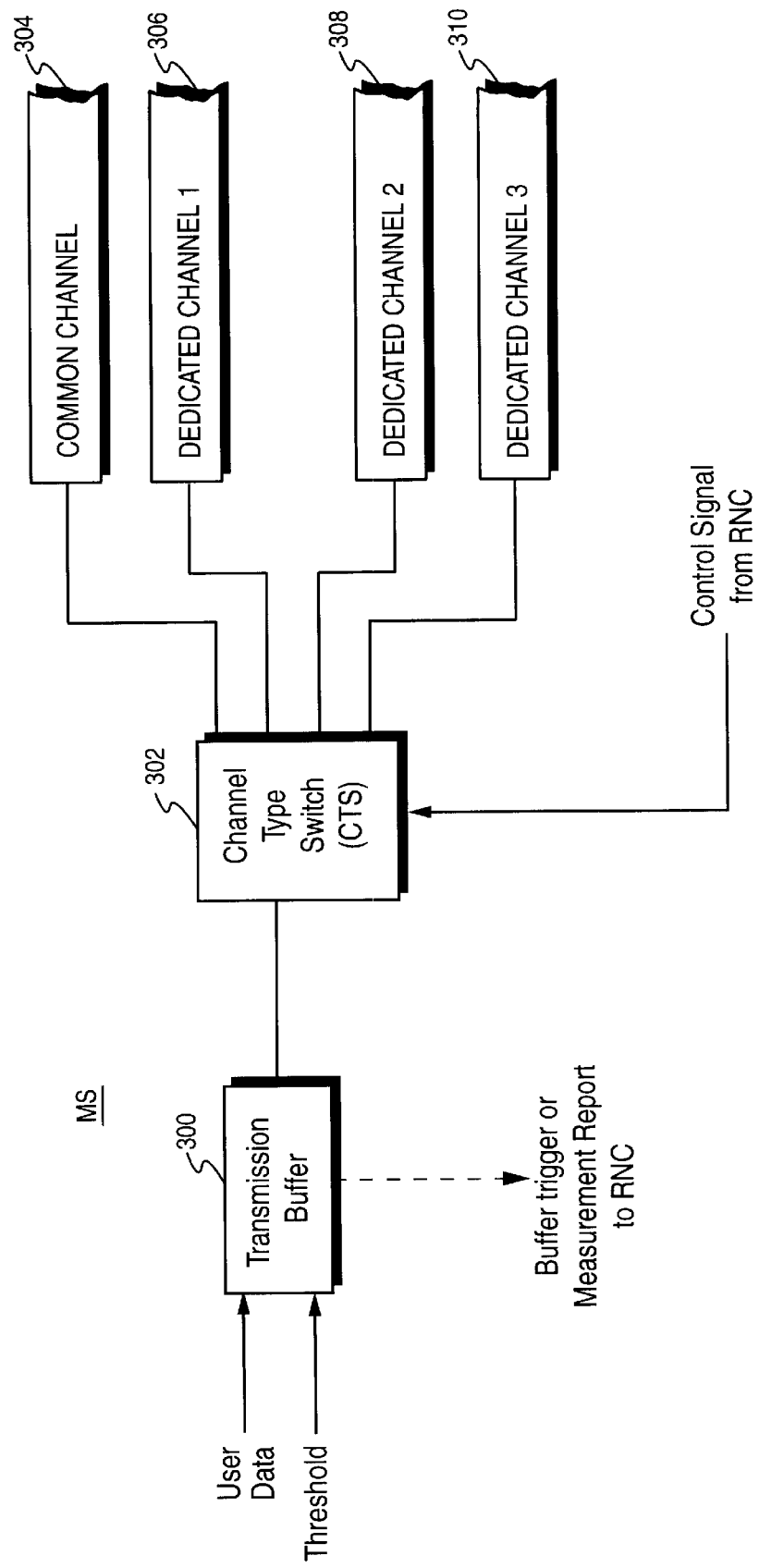
FIG. 15 is a function block diagram illustrating channel switching from the perspective of a mobile station in accordance with the example implementation of FIG. 14.

In this example, many of the functions of the invention are performed in the RNC (or some other radio network node). Accordingly, the mobile station need only support the RNC with information and follow instructions. Referring to FIG. 15, uplink user data is received and stored at a transmission buffer 300, e.g., an RLC buffer. Packets output from the transmission buffer 300 are routed to a channel-type switch (CTS) 302 (e.g., implemented at the MAC layer) to an appropriate communications channel including one or more common channels 304 or dedicated channels DC1–DC3 (306–310). The channel-type switch is controlled by a signal from the RNC. The buffer 300 may optionally send a trigger signal to the RNC when the amount of data to be sent exceeds a threshold. Alternatively, measurement reports could be sent specifying incoming and outgoing data rates, the actual data amount buffered, etc. Other implementations may involve the mobile more substantially.

Using the invention, the chances of rapid cyclic switching ("ping-ponging"or "yo-yoing") are considerably reduced or eliminated. There is considerable flexibility regarding what patterns/trends may be used and what actions (if any) are taken in response to each pattern or trend. For example, channel type switching decisions may be delayed based on a particular pattern or trend to avoid rapid cyclic switching. As a consequence of the sliding window pattern/trend analysis, data processing, channel, and other resources associated with channel switching are used in a more efficient fashion.

While the present invention has been described in terms of a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. Accordingly, it is intended that the invention be limited only by the scope of the claims appended hereto.

What is claimed is:

1. A method for selecting a type of channel to support a mobile radio connection, comprising:
    determining over a number of time intervals information associated with a type of channel supporting the mobile radio connection for each of the time intervals;
    analyzing the determined information for a pattern; and
    making a channel type switching decision based on the analysis,
        wherein if the number of time intervals contains different channel types, the mobile user connection is maintained on only one type of channel for a predefined number of time intervals.

2. The method in claim 1, wherein the channel types include a dedicated type of radio channel temporarily allocated to support one mobile radio connection and a common type of radio channel that can be shared by plural mobile radio connections.

3. The method in claim 1, wherein the channel type switching decision is made to avoid undesirable channel type switching.

4. The method in claim 3, wherein the undesirable channel type switching includes cyclic back and forth channel type switching.

5. The method in claim 1, wherein the information includes a requested quality of service.

6. The method in claim 1, wherein the information includes an amount of data to be transmitted over the mobile radio connection.

7. The method in claim 6, wherein if the data amounts are below a threshold during all of the number of time intervals while the mobile user connection is being supported by a first, higher capacity channel, the mobile user connection is switched to a second, lower capacity type of channel.

8. The method in claim 6, wherein if the data amounts are above a threshold during all of the number of time intervals while the mobile user connection is being supported by a first, lower capacity channel, the mobile user connection is switched to a second, higher capacity type of channel.

9. The method in claim 6, wherein the channel types include a first type of radio channel having a first capacity and a second type of radio channel having a second capacity less than the first capacity, the method further comprising:
    if the mobile radio connection is supported by the second channel and the amount of data to be transmitted for the mobile radio connection exceeds a threshold for a predetermined number of time intervals, switching the mobile radio connection to the first channel.

10. The method in claim 9, further comprising:
    if the mobile radio connection is supported by the second channel and the amount of data to be transmitted for the mobile radio connection does not exceed a threshold for a predetermined number of time intervals, maintaining mobile radio connection on the second channel.

11. The method in claim 9, further comprising:
    if the mobile radio connection is supported by the first channel and the amount of data to be transmitted for the mobile radio connection does not exceed a threshold for a predetermined number of time intervals, switching the mobile radio connection to the second channel.

12. A method for selecting a type of channel to support a mobile radio connection including a first type of radio channel, a second intermediate type of radio channel, and a third type of radio channel, comprising:

determining over a number of time intervals information associated with a type of channel supporting the mobile radio connection for each of the time intervals;

analyzing the determined information for a pattern; and making a channel type switching decision based on the analysis, wherein if a decision is made to switch the mobile radio connection down from the first channel, switching the mobile radio connection to the second intermediate channel, and then if another decision is made to switch the mobile radio connection down from the second channel, switching the mobile radio connection to the third channel.

13. The method in claim 12, further comprising:

if a decision is made to switch the mobile radio connection up from the third channel, switching the mobile radio connection to the second intermediate channel, and then if another decision is made to switch the mobile radio connection up from the second channel, switching the mobile radio connection to the first channel.

14. A method for selecting a type of channel to support a mobile radio connection including a first type of radio channel, a second intermediate type of radio channel, and a third type of radio channel, comprising:

determining over a number of time intervals information associated with a type of channel supporting the mobile radio connection for each of the time intervals;

analyzing the determined information for a pattern; and making a channel type switching decision based on the analysis, wherein if a decision is made to switch the mobile radio connection down from the first channel, switching the mobile radio connection to the third channel, and wherein if a next decision is made to switch the mobile radio connection up within a predetermined time period after the switch down, switching up to the second channel.

15. The method in claim 14, wherein the predetermined time period is associated with an amount of time required to perform a channel switch.

16. A method for selecting a type of channel to support a mobile radio connection, comprising:

establishing a sliding time window divided into a first number of time intervals;

determining for each time interval a type of channel supporting the mobile radio connection and an amount of data to be currently transmitted for the mobile radio connection;

analyzing the channel types and data amounts in the sliding time window; and making a channel type switching decision based on the analysis.

17. The method in claim 16, further comprising:

storing the channel types and data amounts in the sliding time window in an array; and at the end of a next time interval, shifting data in the array so that the channel type and data amount in a last position in the array are removed and a most recently determined the channel type and data amount are stored in a first position in the array, wherein the decision is made using the information stored in the array.

18. The method in claim 16, further comprising:

storing the channel types in the sliding time window in a first array;

storing the amounts of data in the sliding time window in a second array; and at the end of a next time interval, shifting data in the first and second arrays so that the channel type and data amount in a last position in the first and second arrays are removed and a most recently determined channel type and data amount are stored in a first position in the first and second arrays, wherein the decision is made using the information stored in the first and second arrays.

19. The method in claim 16, wherein the amount of data is indicated in the sliding window using plural data amount categories.

20. The method in claim 19, wherein the categories include above a high threshold category, an intermediate amount category, and below a low threshold category.

21. The method in claim 16, further comprising:

establishing another, longer sliding time window divided into a second number of time intervals greater than the first number;

determining for each time interval in the longer sliding time window a type of channel supporting the mobile radio connection and an amount of data to be currently transmitted for the mobile radio connection;

analyzing the channel types and data amounts in the longer sliding time window; and making another decision based on the longer sliding time window analysis.

22. The method in claim 21, wherein the other decision relates to power regulation.

23. The method in claim 21, wherein the other decision relates to channel type switching.

24. The method in claim 16, wherein if the sliding window contains different channel types, the mobile user connection is maintained on only one type of channel for a predefined number of time intervals.

25. The method in claim 16, wherein if the data amounts are below a threshold during the entire sliding window while the mobile user connection is being supported by a first, higher capacity channel, the mobile user connection is switched to a second, lower capacity type of channel.

26. The method in claim 16, wherein if the data amounts are above a threshold during the entire sliding window while the mobile user connection is being supported by a first, lower capacity channel, the mobile user connection is switched to a second, higher capacity type of channel.

27. Apparatus for use in a mobile radio communications system to select a type of channel to support a mobile radio connection, comprising:

a memory, and data processing circuitry coupled to the memory and configured to perform the following tasks:

establish a sliding time window divided into a first number of time intervals;

determine for each time interval a type of channel supporting the mobile radio connection and an amount of data to be currently transmitted for the mobile radio connection;

store the channel type and data amount in the memory, analyze the channel types and data amounts in the sliding time window, and make a channel type switching decision based on the analysis.

28. The apparatus in claim 27, wherein the data processing circuitry is further configured to determining over a first number of time intervals information associated with a type of channel, the information including a requested quality of service.

29. The apparatus in claim 27, wherein the channel types include a dedicated type of radio channel temporarily allocated to support one mobile radio connection and a common type of radio channel that can be shared by plural mobile radio connections.

30. Apparatus for use in a mobile radio communications system and implemented in a radio network control node, comprising:

a memory, and data processing circuitry coupled to the memory and configured to perform the following tasks:
determine over a first number of time intervals information associated with a type of channel supporting a mobile radio connection between a mobile radio and a mobile radio network for each of the time intervals;
store the determined information in the memory,
analyze the determined information for a trend; and
make a channel type switching decision based on the analysis a channel switching mechanism,
wherein the information is the type of channel supporting the mobile radio connection during each of the time intervals, and wherein if the first number of time intervals contains different channel types, the data processing circuitry is configured to control the channel switching mechanism so that the mobile user connection is maintained on only one type of channel for a predefined number of time intervals.

31. The apparatus in claim 27 implemented in a radio network control node further including a channel switching mechanism, wherein if the data amounts are below a threshold during all of the first number of time intervals while the mobile user connection is being supported by a first, higher capacity channel, the data processing circuitry is configured to control the channel switching mechanism so that the mobile user connection is switched to a second, lower capacity type of channel.

32. The apparatus in claim 31, wherein if the data amounts are above a threshold during all of the first number of time intervals while the mobile user connection is being supported by a first, lower capacity channel, the data processing circuitry is configured to control the channel switching mechanism so that the mobile user connection is switched to a second, higher capacity type of channel.

33. Apparatus for use in a mobile radio communications system, comprising:

a memory, and data processing circuitry coupled to the memory and configured to perform the following tasks:
determine over a first number of time intervals information associated with a type of channel supporting a mobile radio connection between a mobile radio and a mobile radio network for each of the time intervals, the information including the type of channel supporting the mobile radio connection during each of the time intervals and an amount of data to be transmitted over the mobile radio connection;
store the determined information in the memory;
analyze the determined information for a trend; and
make a channel type switching decision based on the analysis, wherein the first number of time intervals corresponds to a sliding time window and the channel types and data amounts in the sliding time window are stored in the memory in an array, wherein the data processing circuitry, at the end of a next time interval, is configured to shift data in the array so that the channel type and data amount in a last position in the array are removed and a most recently determined channel type and data amount are stored in a first position in the array, and wherein the data processing circuitry is configured to make the decision using the information stored in the array.

34. The apparatus in claim 33, wherein the channel types in the sliding time window are stored in a first array in memory and the amounts of data in the sliding time window are stored in a second array in the memory.

35. Apparatus for use in a mobile radio communications system, comprising:

a memory, and data processing circuitry coupled to the memory and configured to perform the following tasks:
determine over a first number of time intervals information associated with a type of channel supporting a mobile radio connection between a mobile radio and a mobile radio network for each of the time intervals;
store the determined information in the memory,
analyze the determined information for a trend; and
make a channel type switching decision based on the analysis, wherein the first number of time intervals corresponds to a sliding time window and the data processing circuitry is configured to establish another, longer sliding time window divided into a second number of time intervals greater than the first number, to determine for each time interval in the longer sliding time window a type of channel supporting the mobile radio connection and an amount of data to be currently transmitted for the mobile radio connection, to analyze the channel types and data amounts in the longer sliding time window, and to make another decision based on the longer sliding time window analysis.

36. The apparatus in claim 35, wherein the other decision relates to power regulation.

37. The apparatus in claim 35, wherein the other decision relates to channel type switching.

* * * * *